United States Patent [19]

Tadokoro et al.

[11] 4,367,470

[45] Jan. 4, 1983

[54] DOOR OPERATION CONTROL APPARATUS

[75] Inventors: Hiroyuki Tadokoro; Shigeru Matsuoka; Koji Yamauchi, all of Hitachi, Japan

[73] Assignee: Hitachi, Ltd., Tokyo, Japan

[21] Appl. No.: 279,597

[22] Filed: Jul. 1, 1981

[30] Foreign Application Priority Data

Jul. 2, 1980 [JP] Japan ................................ 55-89158

[51] Int. Cl.$^{3}$ .............................................. H04Q 9/00

[52] U.S. Cl. .......................... 340/825.77; 340/825.63; 340/696

[58] Field of Search ...................... 340/825.77, 825.78, 340/825.63, 825.64, 696

[56] References Cited

U.S. PATENT DOCUMENTS 4,045,775 8/1977 Pearce ............................ 340/825.77

4,300,236 11/1981 Gilmour ........................ 340/825.63

4,311,986 1/1982 Yee ................................ 340/825.63

*Primary Examiner*—Donald J. Yusko

*Attorney, Agent, or Firm*—Antonelli, Terry and Wands

[57] ABSTRACT

A main control circuit for controlling a door open-close drive motor and a lamp illuminating the interior of a garage is disposed in a body of a door operation control apparatus, and an interface circuit for applying control command signals to the main control circuit is connected by two signal conductors to a control box mounted on the wall of the garage. Signal voltages of a plurality of levels can be generated from the control box to be transmitted to the interface circuit by way of the two signal conductors, and the interface circuit discriminates the level of one of the signal voltage transmitted by way of the two signal conductors to apply a control command signal for controlling a controlled object corresponding to the discriminated voltage level.

8 Claims, 9 Drawing Figures

FIG. 7

| MODE | SW 1 (401) | SW 2 (402) | VOLTAGE LEVEL | LIGHT EMITTING DIODE | FUNCTION | |
|---|---|---|---|---|---|---|
| | | | | | DOOR DRIVE | RADIO TRANSMITTER-RECEIVER CIRCUIT LOCKING |
| ① | OFF | OFF | — | OFF | × | × |
| ② | OFF | ON | B | EMITTING LOW-INTENSITY LIGHT | × | ○ |
| ③ | ON | ON | A | EMITTING HIGH-INTENSITY LIGHT | ○ | ○ |
| ④ | ON | OFF | A | EMITTING HICH-INTENSITY LIGHT | ○ | ○ |

○ : EFFECTED

× : NOT EFFECTED

DOOR OPERATION CONTROL APPARATUS

BACKGROUND OF THE INVENTION

1. Field of the Invention

This invention relates to door operation control apparatus, and more particularly to an apparatus of the kind above described which is provided with operation commanding means and control means suitable for controlling a plurality of functions of a garage door operation control apparatus.

2. Description of the Prior Art

A garage door operation control apparatus comprises, as its essential components, a drive motor driving a garage door for opening and closing movement, a main control circuit controlling the drive motor, and a control box applying operation command signals to the main control circuit. Generally, the control box is provided with a push button switch and is mounted on the wall of the garage. The main control circuit is disposed together with the drive motor in a body mounted on the ceiling of the garage, and the control box is electrically connected to the main control circuit by two signal conductors. Each time the push button switch is depressed, the main control circuit controls the state of the garage door in a stepwise fashion in the order of the steps of door opening movement→stopping the door in the open position→door closing movement→stopping the door in the closed position→door opening movement→. . . . In some case, the garage door movement is stopped by means of upper and lower limit switches. The above steps are repeated by the unifunctional garage door operation control apparatus. In order that the apparatus can operate as a multifunctional one and can be more conveniently used, various other functions are added which include (1) a radio control function by radio wave transmission and reception, (2) a radio locking function for rendering ineffective the radio remote control function during absence for a long period of time, (3) a function for controlling the lamp provided for illuminating the internal space of the garage, (4) a function for setting the delay time of deenergization of the illuminating lamp, and (5) a function for directly controlling the door opening or closing movement instead of the stepwise control function. In order to realize these additional functions, necessary improvements must be made in the structure of the main control circuit. In such a case, the control box must also be provided with an increased number of push button switches in order to produce operation command signals enough for achieving the functions described above. Consequently, the number of signal conductors connecting between the control box and the main control circuit is also inevitably increased, resulting in reduction of the reliability of the signal conductor connections, difficulty of acquisition of materials for multisignal conductors, complexity of installation work, etc.

SUMMARY OF THE INVENTION

Objects of the Invention

It is a primary object of the present invention to provide a door operation control apparatus including operation commanding means and control means which eliminate the necessity for increasing the number of signal conductors required for achieving a plurality of operating functions or with which the number of increased signal conductors can be reduced to a minimum.

Features of the Invention

In accordance with the present invention, there is provided a door operation control apparatus including control circuit means for controlling controlled objects including door operating means driving a door for opening and closing movement, and commanding means for generating operation command signals to be applied to the control circuit means, the apparatus comprising two signal conductors electrically connecting between the commanding means and the control circuit means, signal generating means provided in the commanding means for generating a plurality of operation command signals of different voltage levels and selectively transmitting the operation command signals by way of the signal conductors, and discriminating means provided in the control circuit means for discriminating the voltage level of the operation command signal transmitted by way of the signal conductors thereby generating a control signal for controlling the controlled object corresponding to the discriminated voltage level.

BRIEF DESCRIPTION OF THE DRAWINGS

FIG. 7 shows the operating functions of the apparatus under various modes.

DESCRIPTION OF THE PREFERRED EMBODIMENTS

Figure 1:
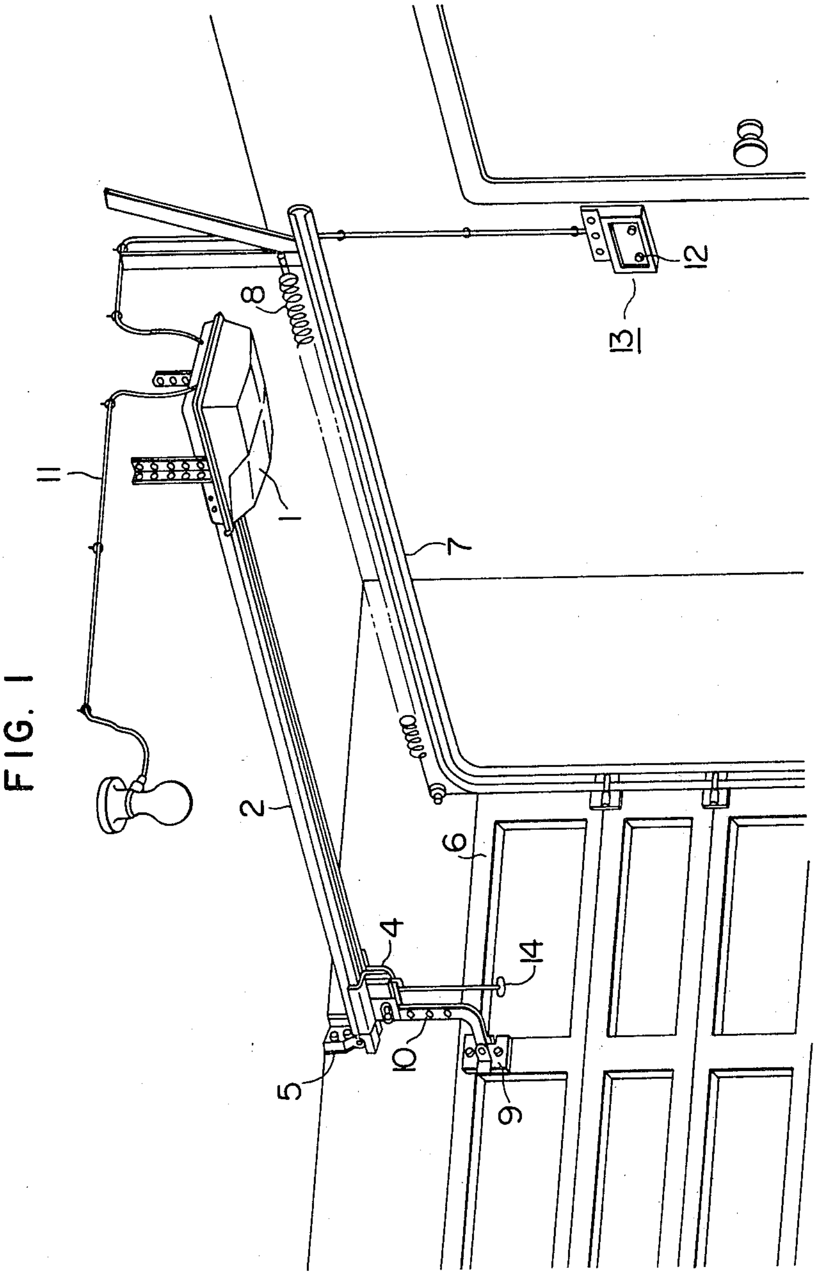
FIG. 1 is a perspective view of the interior of a garage equipped with an embodiment of the door operation control apparatus according to the present invention.

The present invention will be described in detail with reference to the drawings. As shown in FIG. 1, an embodiment of the garage door operation control apparatus according to the present invention comprises essential parts including a body 1 housing a driving system, a rail 2 connected with the body 1, a roller chain guided along the rail 2 by being driven by the driving power of the body 1, and a trolley 4 engaged with the roller chain and adapted to be moved horizontally by being driven by the body 1. The body 1 is hung from the ceiling of the garage by hangers, and an end of the rail 2 is secured to part of the garage by a header bracket 5. A garage door 6, on the other hand, is generally divided into several panels coupled to each other and is opened and closed along door rails 7 disposed on both sides thereof. The weight of the garage door 6 is balanced with door balance springs 8 so that the garage door 6 is capable of being easily operated manually. A door bracket 9 is secured to the garage door 6. The door bracket 9 is rotatably coupled to the trolley 4 through a door arm 10. Thus the garage door 6 is closed or opened along the door rails 7 in an interlocked relation with the trolley 4 horizontally moved along the rail 2 by actuation of the roller chain driven by the driving force of the body 1. Power is supplied to the body 1 through a power cable 11. A command signal voltage is issued by depressing a push button switch 12 on a control box 13 mounted on the wall of the garage and is transmitted to the body 1 by a conductor. Should the garage door operation control apparatus be rendered inoperative by power failure or like accident, a releasing string 14 decouples the roller chain and the trolley 4, thus making the garage door 6 ready for manual operation.

In the form which will be described presently, the control box 13 and the body 1 are connected by two conductors, and the control box 13 is provided with two switches, i.e., a door operating push button switch and a radio transmitter-receiver circuit locking switch, which are depressed for generating a plurality of operation command signals. Description will be first directed to the transmission of these signals from the control box 13 to the body 1.

Figure 2:
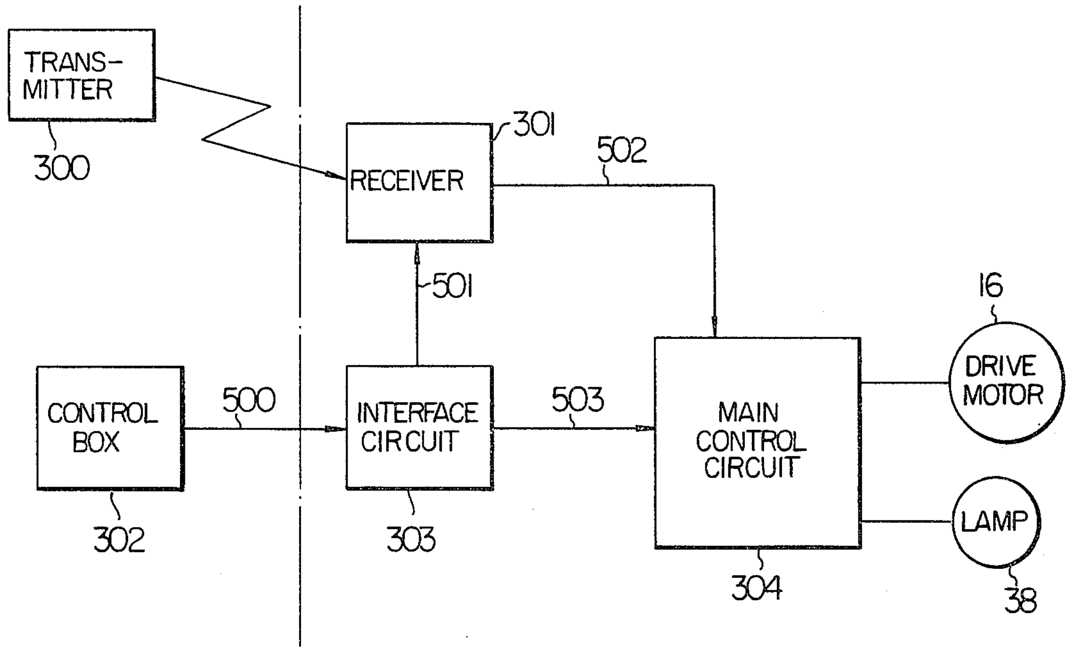
FIG. 2 is a basic block diagram of the electrical circuit of the door operation control apparatus shown in FIG. 1.

FIG. 2 is a basic block diagram of the electrical circuit of the door operation control apparatus according to the present invention. Referring to FIG. 2, the block 300 corresponds to a transmitter transmitting a radio wave signal, and the block 301 corresponds to a receiver or received signal processing circuit which receives and distinguishes the radio wave signal from other signals. This circuit 301 generates an on signal when it receives the radio wave signal transmitted from the transmitter 300, while it generates an off signal when it receives other signals. The block 302 corresponds to the commanding means or control box which generates a plurality of operation command signals and is mounted on the wall of the garage. The block 303 corresponds to an interface circuit which discriminates the level of the input voltage applied from the control box 302. The interface circuit 303 is connected to the control box 302 by two conductors 500. From the interface circuit 303, a control output 501 is connected to the received signal processing circuit 301 to forcedly turn off the output 502 from the circuit 301. The outputs 502 and 503 from the respective circuits 301 and 303 are applied to the block 304 corresponding to the main control circuit to control the latter, so that a door drive motor 16 is rotated in the normal or reverse direction, and garage illuminating lamp 38 is turned on or off.

Figure 4:
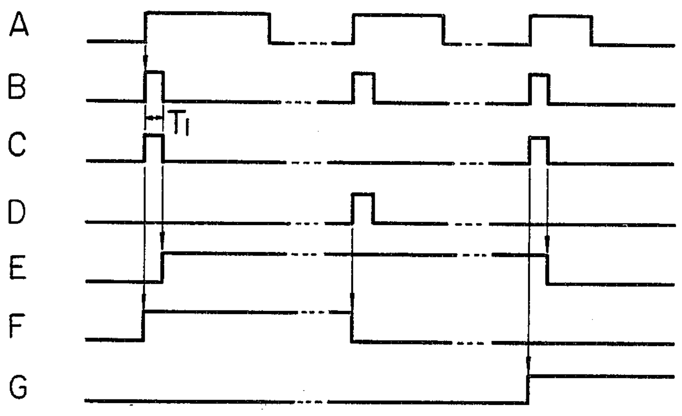
FIGS. 4 and 5 are time charts illustrating the operation of the main control circuit shown in FIG. 3.
Figure 5:
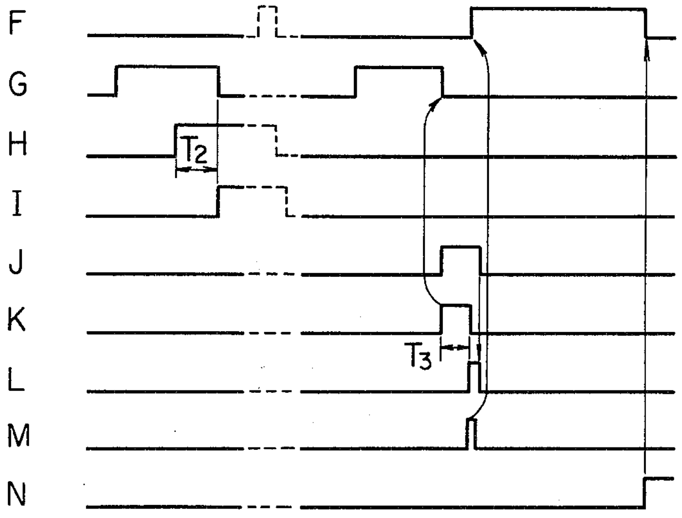

Before describing the structure and operation of the circuits having the above functions, the structure and operation of the main control circuit 304 will be described with reference to FIGS. 3, 4 and 5.

Figure 3:
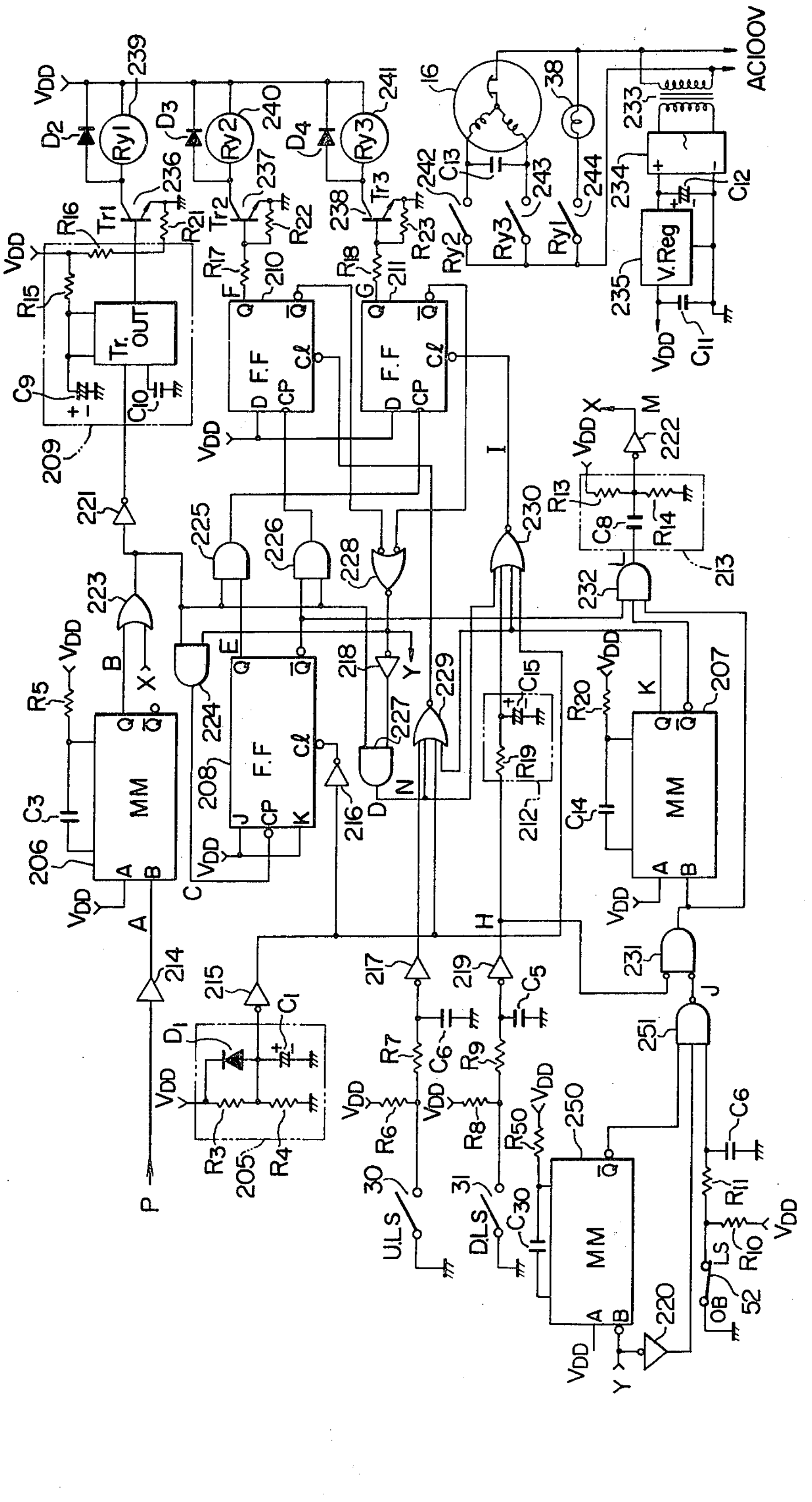
FIG. 3 is a circuit diagram of the main control circuit shown in FIG. 2.

In FIG. 3, the symbol P designates either the signal applied from the control box 302 by depression of the door operating push button switch disposed on the control box 302 or the signal applied from the received signal processing circuit 301 when the radio wave signal transmitted from the transmitter 300 is distinguished from other signals by the circuit 301.

In FIG. 3, reference numeral 30 designates a door upper limit switch, numeral 31 a door lower limit switch, numeral 52 an obstruction detecting limit switch, numeral 205 a power supply reset circuit for producing a reset signal at the rise time of the power supply, numerals 206, 207 and 250 monostable multivibrators, numeral 208 a J-K master slave flip-flop, numeral 209 a timer circuit using NE555 (of Signetics Corporation), numerals 210 and 211 D-type flip-flops, numeral 212 an integrator circuit, numeral 213 a differentiator circuit, numeral 214 a buffer element, numerals

215 to 222 NOT elements, numeral 223 a 2-input OR element, numerals 224 to 228 2-input AND elements, numerals 229 and 230 4-input NOR elements, numeral 231 a 2-input NOR element, numeral 232 a 3-input AND element, numeral 251 a 3-input NAND element, numeral 233 a transformer for control power supply, numeral 234 a diode stack, numeral 235 a voltage regulator for the control power supply, numerals 236 to 238 relay-driving transistors, numerals 239 to 241 relay coils, numerals 242 to 244 contacts of the relays, actuated by the relay coils 239 to 241 respectively, numeral 16 the door drive motor, and numeral 38 the garage illuminating lamp.

The operation of this circuit will be explained below with reference to the time charts of FIGS. 4 and 5.

When power is thrown in this circuit, a control power supply voltage VDD is supplied from the transformer 233 through the diode stack 234 and the voltage regulator 235. The risking waveform of voltage VDD is integrated by the power supply reset circuit 205 thereby to delay the rise thereof, so that a reset pulse is produced from the NOT element 215. The reset pulse resets the J-K master slave flip-flop 208 through the NOT element 216, and further resets the D-type flip-flops 210 and 211 through the 4-input NOR elements 229 and 230.

The buffer element 214 produces a signal A in response to the application of the signal P from the push button switch 12 making up a door operation command or from the received signal processing circuit 301, and the monostable multivibrator 206 produces a signal B of pulse width T1 at the rise point of the signal A. This signal B is applied to the 2-input OR element 223, thence, to the 2-input AND element 224, and a signal C is produced from the AND element 224. The signal C is applied as a clock pulse signal to the J-K master slave flip-flop 208. During the high level period of the signal C before inversion of the output signal E of the flip-flop 208, the output of the 2-input AND element 226 is applied as a clock input signal to the flip-flop 210, so that the flip-flop 210 is set, thereby producing a signal F. This signal F is applied as a door up drive command to the transistor 237 which excites the relay coil 240 for door upward movement. Thus the relay contact 242 is turned on, thereby driving the motor 16 in the forward direction.

In this way, the motor 16 is started. At the same time, the signal B is applied as a trigger signal to the timer circuit 209 through the NOT element 221. This operation is intended to keep the lamp 38 ON for a predetermined length of time after the issue of the door operation command for illuminating the inside of the garage simultaneously with the start of the motor 16. For this purpose, the output of the timer circuit 209 excites the relay coil 239 through the transistor 236, thereby turning on the relay contact 244. As a result, the lamp 38 can be kept lit for a predetermined length of time.

Next, if the upper limit switch 30 is turned on during the appearance of an up command output, the flip-flop 210 is reset through the NOT element 217 and the 4-input NOR element 229, so that the transistor 237 is turned off, the relay coil 240 is de-energized, the relay contact 242 is turned off, and the motor 16 stops. In the case where an operation command is issued again as a result of application of the signal P from the push button switch 12 or from the received signal processing circuit 301, during the appearance of the up command, on the other hand, the pulse signal B is produced from the monostable multivibrator 206 as mentioned above, so that an output is produced from the OR element 223. In view of the fact that the flip-flop 210 is set, however, the output of the 2-input AND element 228 is in its low level, thus prohibiting the output of the 2-input AND element 224. The output of the NOT element 218 is in its high level at this time, and therefore, the pulse signal B applied to the 2-input AND element 227 appears in the form of a signal D from the 2-input AND element 227. This signal D is applied through the 4-input NOR element 229 to the flip-flop 210 as a reset signal. In this way, the motor 16 is stopped in this case, too. Upon receipt of another operating command under this condition, the output of the 2-output AND element 226 is prohibited in view of the fact that the J-K master slave flip-flop 208 is set, so that the signal B passes through the 2-input AND element 225, and the flip-flop 211 is set, thus producing a signal G from the flip-flop 211. As a result, the transistor 238 is turned on, the door down drive relay coil and 241 is excited, its relay contact 243 is turned on, the motor 16 is driven in the reverse direction, and thus the door is moved down.

If the lower limit switch 31 is turned on during the downward movement, a signal H is produced from the NOT element 219 and, after being delayed by time T2 at the integrator circuit 212, applied as a reset signal I to the flip-flop 211 via the 4-input NOR element 230. In this way, the motor 16 is stopped as in the case of the upper limit switch 30 being turned on during upward movement.

Next, the operation of the circuit with the obstruction detecting limit switch 52 turned on will be explained. Assume that the obstruction detecting limit switch 52 is turned on when the door is moving up, i.e., when the J-K master slave flip-flop 208 is set, the flip-flop 210 is set and the flip-flop 211 is reset. In view of the fact that the obstruction detecting limit switch 52 is closed at contact B, it is turned off. Thus, a signal J is applied to the 3-input NAND element 251, and a high level signal appears from the 2-input NOR element 231 to trigger the monostable multivibrator 207. The Q output pulse of the monostable multivibrator 207 resets the flip-flop 210 through the 4-input NOR element 229. At this time, the J-K master slave flip-flp 208 is set, and, therefore, the output of the 4-input AND element 232 is prohibited.

Next, assume that the obstruction detecting limit switch 52 is turned on during the downward movement, i.e., when the J-K master slave flip-flop 208 is reset, the flip-flop 210 is reset and the flip-flop 211 is set. The signal J produced from the 3-input NAND element 251 is applied through the 2-input NOR element 231 to the monostable multivibrator 207, and a signal K with pulse width T3 is produced from the monostable multi-vibrator 207. This signal K resets the flip-flop 211 through the 4-input NOR element 230. As a result, the motor 16 is stopped and the door stops moving down. Further, at the fall point of the pulse signal K, the output $\overline{Q}$ of the monostable multivibrator 207 rises so that the 3-input AND element 232 produces a high level signal L. This signal L is converted into a signal M through the differentiator circuit 213 and the NOT element 222 and applied to the 2-input OR element 223. In this way, the signal F which is an up command is produced by the above-mentioned control process, with the result that the door moves up until it stops in response to the turning-on of the upper limit switch 30, hence, appearance of an output signal N from the NOR element 217.

As will be seen from above, when the door detects an obstruction, the door is immediately stopped if moving up, and it is immediately stopped and begins to move up after the time period of T3 if moving down, thus securing the operating safety. In order to prevent the obstruction detection means from being unduly actuated by a small obstacle such as a stone or a rod located near the door lower limit switch 31 or the rise of the floor level due to snow in winter, the turning-on of the lower limit switch 31 causes the 2-input NOR element 231 to immediately prohibit the subsequent operation of obstruction detection, and the signal G making up a down command is reset by the signal I produced with delay time T2 from the integrator circuit 212, thus stopping the door. During the door stoppage, the input of the obstruction detecting limit switch 52 is prohibited by the NOR element 231. Also in the case where the door stops with the obstruction detecting limit switch 52 being actuated while the door is moving up, the switch 52 is generally turned off. In order to assume smooth door starting under such a condition, at the fall point of the output Y of the 2-input AND element 228, namely, in response to a door start signal, the monostable multivibrator 250 is triggered and the output thereof is applied as one of the inputs to the 3-input NAND element 251 thereby to ignore the obstruction detection signal as long as the particular output is produced. The negation of the obstruction detecting signal during door stoppage is of course attained by applying the output Y of the 2-input AND element 228 to the 3-input NAND element 251 through the NOT element 220 at the same time.

The parts provided according to the present invention will now be described with reference to FIGS. 6 and 7.

Figure 6:
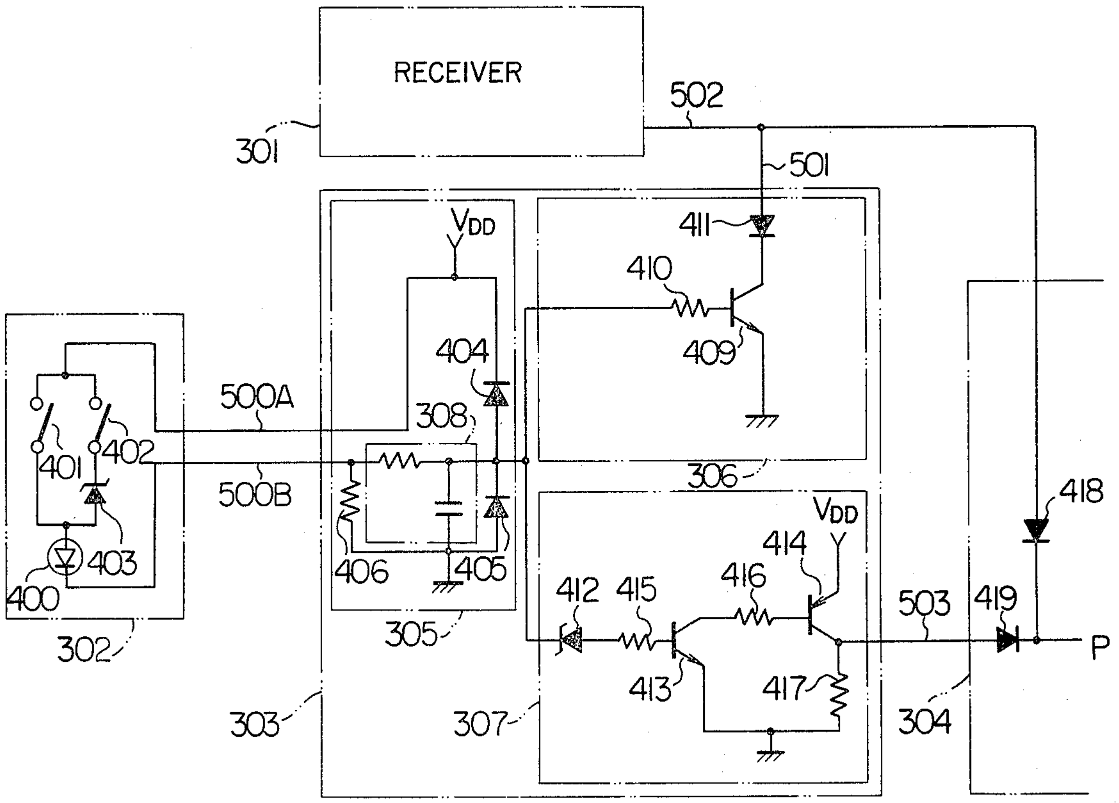
FIG. 6 is a circuit diagram of the operation commanding means and signal discriminating means.

FIG. 6 shows the internal structure of the control box 302 and interface circuit 303 and shows also the connections between the received signal processing circuit 301 and the main control circuit 304.

Referring to FIG. 6, the control box 302 which is the commanding means includes a door operating push button switch 401, a radio transmitter-receiver circuit locking switch 402, a Zener diode 403 for generating modified voltage levels, and a light emitting diode 400, so that the control box 302 can generate two kinds of operation command signals of different voltage levels respectively. The control box 302 is connected by two conductors 500A and 500B to the interface circuit 303. When the door operating push button switch 401 is turned on, a voltage level A ($=V_{DD}$) is applied as an input to the interface circuit 303, and, at the same time, the light emitting diode 400 is energized to emit light of higher intensity. When, on the other hand, the radio transmitter-receiver circuit locking switch 402 is turned on, another voltage level B ($=V_{DD}-V_{ZD11}$) is applied as another input to the interface circuit 303 through the voltage level generating Zener diode 403 (whose Zener voltage drop is $V_{ZD11}$), and, at the same time, the light emitting diode 400 emits light of lower intensity. Further, when both of the door operating push button switch 401 and the radio transmitter-receiver circuit locking switch 402 are simultaneously turned on, the door operating push button switch 401 predominates over the switch 402 due to the Ohm's law, and the voltage level A appears preferentially at the input of the interface circuit 303, with the light emitting diode 400 emitting light of higher intensity.

The structure of the interface circuit 303, which is connected to the main control circuit 304, will then be described.

The operation command signal at each of the voltage levels generated from the control box 302 is transmitted through an interface 305 to a radio receiver-transmitter circuit locking control circuit 306 and to a door operation control circuit 307.

The interface 305 includes a pair of reverse-voltage protective diodes 404 and 405, a current-limiting resistor 406 for limiting current flowing through the door operating push button switch 401 and radio transmitter-receiver circuit locking switch 402 in the control box 302, and an integrator circuit 308.

The radio transmitter-receiver circuit locking control circuit 306 includes a switching transistor 409, a drive resistor 410 for driving the switching transistor 409, and a diode 411 for blocking flow of reverse current to the received signal processing circuit 301. The switching transistor 409 is turned on and kept in that position when a voltage level higher than the ground potential level is continuously applied to its base from the interface 305. Thus, the output 501 of low level appears from the transmitter-receiver circuit locking control circuit 306, and the output 502 of the received signal processing circuit 301 maintains its low level, so that the aforementioned radio transmitter-receiver circuit locking function is effected. Therefore, even when a radio wave input may be transmitted from the transmitter 300 to the received signal processing circuit 301, no operating signal is applied to the main control circuit 304 from the processing circuit 301.

The door operation control circuit 307 includes a Zener diode 412 for discriminating the applied voltage level (the Zener voltage drop across this Zener diode 412 being $V_{ZD12}$), switching transistors 413, 414, drive resistors 415, 416 for driving the respective switching transistors 413, 414, and a current-limiting resistor 417 for limiting collector current of the switching transistor 414. The Zener voltage drop $V_{ZD12}$ across the voltage level discriminating Zener diode 412 is selected to satisfy the relation $$V_{DD}-V_{ZD11}<V_{ZD12}<V_{DD}.$$

The switching transistor 413 is turned on and kept in that position when a voltage level higher, by more than $V_{ZD12}$, than the ground potential level is continuously applied from the interface 305 to the base thereof, and, then, the switching transistor 414 is also turned on. Thus, the output 503 of high level appears from the door operation control circuit 307, and the input to the main control circuit 304 maintains its high level, so that the aforementioned door operating function is effected.

The general operation of the circuits shown in FIG. 6 will now be described with reference to FIG. 7. In FIG. 7, the symbols SW1, SW2 and LED designate the door operating push button switch 401, the radio transmitter-receiver circuit locking switch 402 and the light emitting diode 400 respectively.

The operation in the case of the mode (1) will be firstly described. In this mode (1), the switches SW1 and SW2 are both in their off state, and no voltage is applied from the interface 305 to any one of the blocks 306 and 307. Thus, both of the door operating function and the radio transmitter-receiver circuit locking function are not carried out.

In the mode (2), the switch SW1 is in its off state, while the switch SW2 is turned on, and the voltage level B appears from the control box 302. This voltage level B is applied through the interface 305 to the blocks 306 and 307. However, the block 307 does not operate at this voltage level B ($<V_{ZD12}$). Thus, the door operating function is not carried out, and the radio transmitter-receiver circuit locking function only is carried out.

In the mode (3), the switches SW1 and SW2 are both turned on, and the voltage level A appears preferentially from the control box 302. This voltage level A is applied through the interface 305 to the blocks 306 and 307. The block 307 operates in response to the application of the voltage level A, since the applied voltage level is higher than $V_{ZD12}$ unlike the case of the mode (2). Thus, both of the door operating function and the radio transmitter-receiver circuit locking function are carried out.

In the case of the mode (4) too, the voltage level A appears from the control box 302. Thus, the operation is the same as that in the mode (3).

According to the aforementioned embodiment of the present invention, the commanding means for commanding both of the door operating function and the radio transmitter-receiver circuit locking function can be arranged in a compact fashion in the single control box 302, and only two conductors 500A, 500B are required for the connection between the control box 302 and the control means in the body 1, thereby greatly improving the reliability and facilitating the installation work. Further, by virtue of the fact that two voltage levels are selected to indicate the priority order of the above functions, the function being carried out can be readily identified by the intensity of light emitted from the light emitting diode 400. Further, when the specific voltage level, discriminated by the interface 305 is the higher voltage level, the function corresponding to the lower voltage level can also be carried out at the same time. This is effective for preventing mal-operation thereby ensuring the safety of operation.

The aforementioned embodiment of the present invention is also featured by the fact that a diode determining the direction of current flow is inserted in a portion of the two conductors 500A, 500B connecting between the control box 302 and the body 1, for the purpose of avoiding a misconnection. Therefore, when the diode is connected in the reverse direction, the control means in the body 1 would not operate in response to the depression of any one of the switches 401 and 402. Such a diode is housed within the control box 302 and is replaced by the light emitting diode 400, so that depression of either switch 401 or 402 can be readily identified by the intensity of light emitted from the diode 400. This improves also the manipulation of the control box 302.

Further, according to the aforementioned embodiment of the present invention, the complex control and identification algorithm such as the time-sharing control and timing control for the purpose of serial transmission of multiple information are utterly unnecessary, and the system can be realized at extremely low costs.

Modifications of the electrical circuit shown in FIG. 2 will be described with reference to FIGS. 8 and 9.

Figure 8:
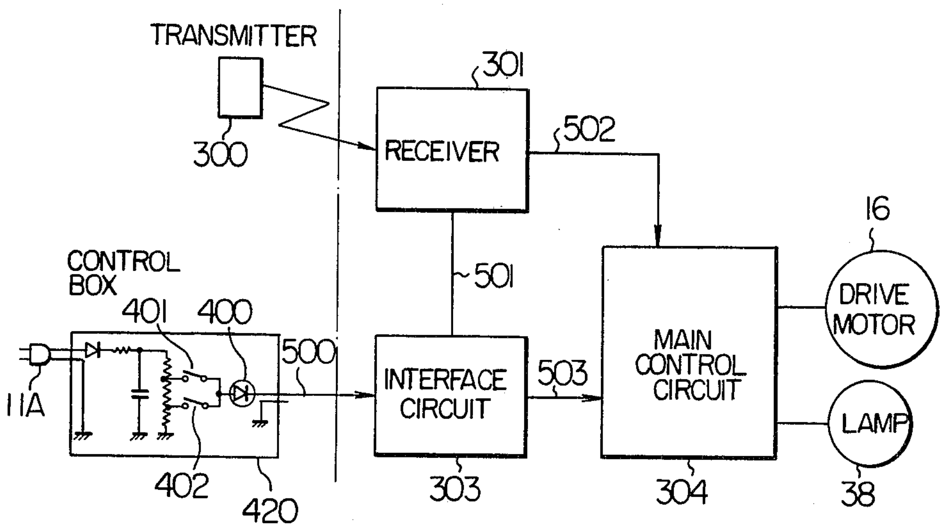
FIGS. 8 and 9 are circuit diagrams of modifications of the electrical circuit shown in FIG. 2.

The modification shown in FIG. 8 differs from FIG. 2 in that the control power supply voltage is not supplied from the body 1, but other means is provided to supply the control power requirement to a control box 420. This other means may be a battery or a power supply line 11A connected to a commercial AC power source at 100 V or 120 V, as shown. Referring to FIG. 8, the commercial AC voltage supplied by the power supply line 11A is rectified and smoothed, and, then, a plurality of signal voltages of different levels are generated by voltage dividing elements, the switches 401 and 402 being selectively depressed to send out the selected operation command signal to the interface circuit 303 by way of the signal transmission line 500. By the provision of the additional power source in the control box 420 for independently enabling the circuit operation, the interlock control circuit and priority control circuit can be easily assembled on the side of the control box 420.

Figure 9:
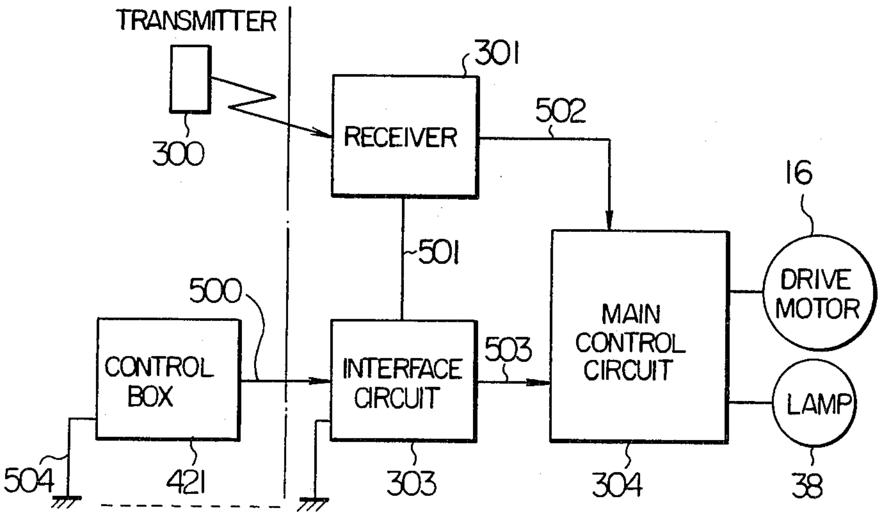

The modification shown in FIG. 9 differs from FIG. 2 in that a control box 421 is connected by only one of the conductors 500 to the body 1 for the purpose of voltage level transmission, and the other conductor 500 is replaced by a grounding conductor 504. In other words, the body 1 is necessarily grounded to improve the safety of the apparatus. Thus, the equivalent connections can be provided by grounding one of the terminals of the control power source supplying $V_{DD}$ to the body 1 and by connecting the control box 421 to ground by the grounding conductor 504.

This embodiment can reduce the number of required conductors. Further, according to this embodiment, occurrence of, for example, loosening connection of any one of the grounding conductors results in impossibility of operation of the control means in the body 1 in response to the operation command signal applied from the control box 421. Therefore, such a faulty state can be directly detected, thereby greatly improving the safety of the whole apparatus.

In another embodiment of the present invention, the voltage dividing element which is the Zener diode may be replaced by a resistor.

In another embodiment of the present invention, the number of conductors connecting between the control box 302 and the body 1 may be increased as described to meet a requirement for carrying out more functions without being encountered with any practical difficulty.

In another embodiment of the present invention, the voltage dividing element may be replaced by a plurality of elements generating a voltage levels different from the normal voltage levels to be discriminated from the normal voltage levels when a plurality of switches are depressed simultaneously. In such an embodiment, the correspondence between the generated voltage levels and the specific combination of the plural switches may merely be previously determined. In one form of such an embodiment, a plurality of resistors (voltage hearing elements) having resistance values weighted according to the binary number system, for example, 10kΩ:20kΩ:40kΩ:. . . =1:2:4:. . . are provided in parallel, kΩ:=1:2:4:. . . are providedin parallel, and a plurality of switches are connected in series with these resistors respectively. When selected ones of the plural switches are simultaneously depressed, the total resistance value is represented by the combined resistance value of the parallel resistors, and this combined resistance value is detected to discriminate the specific voltage level. In other words, the weighted resistors may be considered as input impedances of an operational amplifier circuit.

In another embodiment of the present invention, a D/A converter or an A/D converter may be preferably used as the voltage dividing element or voltage level discriminating circuit so that it serves as a means for further improving the resolution of the voltage levels.

It will be understood from the foregoing detailed description of the present invention that the control box generating many operation command signals for carrying out multiple functions can be connected to the body of the apparatus by a smallest possible number of conductors, so that the installation of the apparatus is greatly facilitated and the possibility of a misconnection is also reduced, thereby greatly improving the safety and reliability of the apparatus. Further, the apparatus according to the present invention, in which DC voltage levels are used as operation command signals, can be constructed at very low costs since it does not require a circuit such as memory means commonly employed in the time-sharing transmission of multiple information.

We claim:

1. A door operation control apparatus including control circuit means for controlling controlled objects including door operating means driving a door for opening and closing movement, and commanding means for generating operation command signals to be applied to said control circuit means, said apparatus comprising two signal conductors electrically connecting between said commanding means and said control circuit means, signal generating means provided in said commanding means for generating a plurality of operation command signals of different voltage levels and selectively transmitting said operation command signals by way of said signal conductors, and discriminating means provided in said control circuit means for discriminating the voltage level of one of said operation command signals transmitted by ways of said signal conductors thereby generating a control signal for controlling the controlled object corresponding to a said discriminated voltage level.

2. A door operation control apparatus as claimed in claim 1, wherein said signal generating means includes a plurality of switches connected in parallel between said two signal conductors, and a voltage dividing element connected in series with said switches.

3. A door operation control apparatus as claimed in claim 2, wherein said voltage dividing element is a Zener diode.

4. A door operation control apparatus as claimed in claim 1, 2 or 3, wherein a diode is connected in its forward direction to one of said two signal conductors.

5. A door operation control apparatus as claimed in claim 4, wherein said diode is a light emitting diode provided in said commanding means.

6. A door operation control apparatus as claimed in claim 1, wherein said signal generating means is constructed to generate said operation command signals in such a relation that an operation command signal corresponding to a controlled object of higher priority has a higher voltage level, than the remaining.

7. A door operation control apparatus as claimed in claim 6, wherein said discriminating means generates, in response to the application of an operation command signal, a control signal for controlling a controlled object corresponding to the voltage level of the applied operation command signal and, generates, at the same time, a control signal for controlling another controlled object corresponding to another operation command signal of voltage level lower than that of the first-mentioned operation command signal.

8. A door operation control apparatus as claimed in claim 1, wherein said signal generating means includes a power source, a plurality of voltage dividing elements dividing the voltage of said power source for generating a plurality of signal voltages of different levels respectively, and a plurality of switches selectively actuated for transmitting a selected one of said signal voltages as an operation command signal to said control circuit means by way of said signal conductors.

* * * * *